UNITED STATES PATENT OFFICE.

CHARLES F. FLEMING, OF SAN JOSE, CALIFORNIA.

METHOD OF PACKING DRIED PRUNES.

1,356,614.      Specification of Letters Patent.    Patented Oct. 26, 1920.

No Drawing.     Application filed April 3, 1920. Serial No. 371,112.

*To all whom it may concern:*

Be it known that I, CHARLES F. FLEMING, a citizen of the United States, residing at San Jose, in the county of Santa Clara and State of California, have invented certain new and useful Improvements in Methods of Packing Dried Prunes, of which the following is a specification.

My invention relates, in general, to the canning art and to the methods and processes used therein for sterilizing, packing and preserving comestibles in hermetically sealed containers. It relates particularly to these methods and processes when applied to dried fruit and more especially in their application to dried prunes, in terms of which I shall herein describe my invention, though it is to be used with any dried fruit to the canning of which it may be applicable.

Heretofore in preparing or as it is termed "processing" dried prunes both for packing in wooden boxes and in hermetically sealed containers, the dried prunes are subjected to a bath of hot water or steam, varying according to the condition of the fruit, from three to six minutes, the object being to soften and sterilize the prunes, preliminary to packing. Upon the completion of this initial bath, the prunes are subjected to a shaking action for the purpose of relieving them of external moisture, and allowing them to become surface dry. The fruit is then placed in boxes or in cans, at the required weight.

But here the similarity of the present practice, concerning the packing in boxes and the packing in cans, ceases, for while no further step is taken with regard to the fruit in boxes, it is customary with respect to the fruit in cans to run the cans, after filling and hermetically sealing, through a cooker, in order to insure the destruction of all germs and thereby properly preserve the contents, as well as to cook them ready for consumption.

I have found, in practice, that under the prevailing conditions of the method above described, the final step of cooking is not efficient, for the reason that a sufficiently thorough "cook" is not possible. The prunes have to be weighed and pressed into the cans, after their preliminary "processing" as above described. On the one hand, if they are moist beyond a certain point, they cannot be handled without breaking. On the other hand, if they have less moisture, enabling them to be safely handled, they have not enough moisture to insure a thorough cook.

By my invention I overcome these difficulties, essentially by avoiding the necessity of handling the prunes and at the same time obtaining sufficient moisture to insure a thorough cooking.

From the foregoing my method, which I shall now fully described, will be readily understood.

I first fill the cans, by weight, with the "unprocessed" prunes, by which I mean the dried prunes, while dry, or as it may be properly termed the dry dried prunes. Then I supply each can with water either hot or cold, to the can's capacity. Then while the cans are still unsealed I subject them to a preliminary heat, necessary to bring their contents to, or nearly to the boiling point, whereby the air is exhausted therefrom. This step, in itself, is well known in the canning art, being commonly called the first or "exhaust" cook and is accomplished in what is known as an "exhaust box," which comprises a heated chamber through which the unsealed filled cans are carried through a more or less extensive path until their contents are deprived of the entrained air.

In my method, therefore, I also carry out this step of exhausting the air, by passing my unsealed water-filled cans of weighed dried prunes through an exhaust box. Then I drain out, as by inverting the cans, all surplus moisture, and immediately seal the cans. Then, finally, I subject the air-exhausted drained and sealed cans to a final heat necessary to insure a thorough cooking. This is effected in any suitable form of cooker, but best in one known as an "agitating" cooker, that is a heating box in which the cans, in addition to their general travel through the apparatus, are individually moved, as for example, rolled on their axes, thereby insuring a quicker and more thorough cooking by reason of a better application of the heat to the entire contents of each can and preventing the collection in one place of such small quantity of water as will necessarily still remain in the can after the draining by inversion step. Thus no portion of the contents will tend to over-saturation but all parts of the contents will equally absorb the water.

It will now be seen that since the prunes do not have to be handled, as in the common "processing," I am able to give them a much more complete soaking, thereby putting them in a condition to respond later to a thorough cooking. The soaking and the heating in the exhaust box step are sufficient to produce an entirely satisfactory vacuum in each can, and the subsequent draining of the cans while relieving them of surplus water, still leaves enough moisture to insure a final thorough cooking.

Although, as I have stated, the ordinary exhaust box treatment produces a satisfactory vacuum, it may be advisable, if for any reason a more arbitrary and positive measure of vacuum be desired, to subject the cans, after draining to a more positive vacuum effect, as, for example, such as may be had in a vacuum machine, and in this case such operation and that of capping or sealing the cans may take place at the same time.

I claim :—

1. The method of packing dried fruit which consists in filling cans with the dry dried fruit; adding water; subjecting the filled cans, while unsealed to a preliminary heat sufficient to expel the air from their contents; draining off from the cans the surplus water; sealing the cans; and, finally, subjecting them to a final heat sufficient for a thorough cooking of their contents.

2. The method of packing dried fruit which consists in filling cans with the dry dried fruit; adding water; subjecting the filled cans, while unsealed to a preliminary heat sufficient to expel the air from their contents; draining off from the cans the surplus water; sealing the cans; and, finally, subjecting them under agitation to a final heat sufficient for a thorough cooking of their contents.

3. Those steps in the method of packing dried fruit which consist in filling cans with the dry dried fruit; adding water; subjecting the filled cans while unsealed to heat; draining off the surplus water; and then sealing the cans.

In testimony whereof I have signed my name to this specification.

CHARLES F. FLEMING.